United States Patent
Alvarez Marcos et al.

(10) Patent No.: US 10,635,568 B2
(45) Date of Patent: Apr. 28, 2020

(54) METHOD AND A SYSTEM FOR MONITORING BATCH PROCESSING OF APPLICATIONS EXECUTED IN IT INFRASTRUCTURE

(71) Applicant: BULL SAS, Les Clayes Sous Bois (FR)

(72) Inventors: José Ignacio Alvarez Marcos, Saint Jean d' Ardieres (FR); Bruno Demeilliez, Saint Martin d'Uriage (FR); Florent Rochette, Seyssinet Pariset (FR)

(73) Assignee: BULL SAS, Les Clayes Sous Bois (FR)

( * ) Notice: Subject to any disclaimer, the term of this patent is extended or adjusted under 35 U.S.C. 154(b) by 95 days.

(21) Appl. No.: 15/850,080

(22) Filed: Dec. 21, 2017

(65) Prior Publication Data

US 2018/0246798 A1    Aug. 30, 2018

(30) Foreign Application Priority Data

Dec. 29, 2016 (FR) ..................... 16 63518

(51) Int. Cl.
*G06F 11/34* (2006.01)
*G06F 11/30* (2006.01)

(52) U.S. Cl.
CPC ........ *G06F 11/3495* (2013.01); *G06F 11/302* (2013.01); *G06F 11/3003* (2013.01); *G06F 11/3433* (2013.01); *G06F 11/3466* (2013.01); *G06F 11/3409* (2013.01); *G06F 2201/81* (2013.01); *G06F 2201/83* (2013.01); *G06F 2201/835* (2013.01); *G06F 2201/86* (2013.01); *G06F 2201/865* (2013.01)

(58) Field of Classification Search
CPC ............. G06F 11/3433; G06F 11/3466; G06F 11/3495; G06F 11/3409; G06F 11/3003; G06F 2201/81; G06F 2201/86; G06F 2201/865

See application file for complete search history.

(56) References Cited

U.S. PATENT DOCUMENTS 9,451,017 B2 * 9/2016 Greifeneder ............ H04L 67/10
9,781,194 B2 * 10/2017 Clarke ................ H04L 67/1008
9,813,487 B2 * 11/2017 Clarke ................ H04L 67/1008

(Continued)

OTHER PUBLICATIONS

Polo, et al., "Resource-aware Adaptive Scheduling for MapReduce Clusters," Barcelona Supercomputing Center, et al., Network and Parallel Computing, Springer International Publishing, Dec. 12, 2011, Cham, Spain, pp. 1-20.

*Primary Examiner* — Nadeem Iqbal
(74) *Attorney, Agent, or Firm* — Hauptman Ham, LLP

(57) ABSTRACT

A method and a system for monitoring batch processing of applications executed in IT infrastructure. The method being implemented by monitoring software configured for detection of at least one congestion incident of the computing resources of said infrastructure and for identification of at least one batch at the origin of said incident, by way of the following steps: recording of the usual consumption of said resources by the batches; follow-up of the execution of the batches over time; measuring, by a monitoring tool, of the instantaneous consumption of said resources; comparison, for said identification, between the instantaneous consumption and the usual consumption of each of the batches executed during a period close to the incident.

15 Claims, 2 Drawing Sheets

(56) References Cited

U.S. PATENT DOCUMENTS

| | | | |
|---|---|---|---|
| 2006/0048155 A1* | 3/2006 | Wu | G06F 9/4843 |
| | | | 718/101 |
| 2014/0082614 A1* | 3/2014 | Klein | G06F 9/45558 |
| | | | 718/1 |
| 2014/0201747 A1 | 7/2014 | Pattnaik et al. | |
| 2015/0033233 A1* | 1/2015 | Hosokawa | G06F 9/4887 |
| | | | 718/102 |
| 2015/0234816 A1* | 8/2015 | Chong | G06F 11/3006 |
| | | | 707/722 |
| 2015/0288579 A1* | 10/2015 | Clarke | H04L 67/1008 |
| | | | 709/224 |

* cited by examiner

METHOD AND A SYSTEM FOR MONITORING BATCH PROCESSING OF APPLICATIONS EXECUTED IN IT INFRASTRUCTURE

TECHNICAL FIELD OF THE INVENTION

The present invention relates to the field of monitoring IT infrastructure and more particularly that of batch processing in the applications executed within these IT infrastructures. These batch processing are present in most applications and are automatic concatenations of sets of commands (processes) on a computer without intervention by a user. Once one is terminated (irrespective of the result), the computer processes the following batch. The batch processing ends once all batches of a stack have been executed.

Triggering these processing can be automated, for example by way of a scheduler. Batch processing must be scheduled to avoid competing access issues or to smooth the applicative load. In this way, the aim of the scheduler is generally to also ensure the order of precedence of the processing. In fact, some processing must be carried out only when other processing are finished. Batch processing are used above all for automated tasks, for example for managing accounts over the computer equipment of a public or private entity. Works launched in batches generally use only the processing cycles not used by interactive or transactional works. They are generally executed outside standard ranges of use of applications (night and week-ends) but not only.

TECHNOLOGICAL BACKGROUND OF THE INVENTION

A problem in the field of batch processing of applications is these are often long and critical processing which are necessary to ensure proper operation of the application during production, i.e., for users during their work hours. In particular, the execution of batch processing sometimes causes congestion at the IT infrastructure resources, which endangers operation of the application in production. Such a congestion incident is often characterized by saturation of one or more resources on one or more servers and a significant increase in their duration due to congestion of a resource. Due to prolonging of execution time, in some cases it happens that all processing cannot be executed in the allotted time. In some cases, production even has to be discontinued if the processing were not able to be completed in the planned period. In this way, when incidents occur in production, analysis must be conducted to determine the origin. One particular problem relates to the fact that this analysis is difficult, especially when an incident is linked to batch processing because the sole information available is generally what is linked to scheduling mechanisms.

In this context, it is interesting to propose a solution proposing tools for monitoring batch processing and enabling diagnosis identifying the processing likely to be at the origin of congestion incidents which occur in production.

GENERAL DESCRIPTION OF THE INVENTION

An aim of the present invention is to eliminate some drawbacks of the prior art by proposing a method for diagnosis of congestion incidents in the IT infrastructure.

This aim is achieved by a method for monitoring batch processing of applications executed in IT infrastructure, according to a planning calendar determined by a scheduler, the method being characterized in that it is implemented by monitoring software configured for detection of at least one event, known as incident, of congestion of the computing resources of said infrastructure and for identification of at least one batch likely to participate in the cause of said incident, by way of implementing the following steps:

recording, in a memory accessible by the monitoring software, of data representative of the usual consumption of the computing resources of said infrastructure by the batches over time, from the data representative of said planning calendar;

follow-up of the execution of all the batches over time by way of the data representative of said planning calendar;

measuring, by a monitoring tool, of the instantaneous consumption of the computing resources of said infrastructure over time;

comparison, for each of the batches executed during a period close to the incident detected, between the data representative of the instantaneous consumption and the data representative of the usual consumption to enable said identification.

According to another particular feature, the detection step of at least one incident of computing resources of said infrastructure triggers timestamping of said incident.

According to another particular feature, the timestamping step of said incident is followed by determination of the time period close to this event, by the monitoring software, this period able to be extended to a time interval preceding and/or succeeding the event.

According to another particular feature, the recording step of the data representative of the usual consumption of the computing resources comprises a recording step, for each of the batches, of a consumption profile of resources throughout the duration of execution of the batch.

According to another particular feature, the identification step obtained during analysis of an incident triggers generation, by the monitoring software, of a diagnosis report for providing aid to analysis and/or decision for a user of the monitoring software to determine the measures to be taken to avoid other incidents during future execution of the batches and optionally modify the calendar as a consequence.

According to another particular feature, the detection step of at least one incident by the monitoring software triggers a recording in a memory accessible by the monitoring software of a footprint for each of the batches executed during said period close to the incident, especially by way of the data obtained during the measuring step of the instantaneous consumption.

According to another particular feature, the detection step of at least one incident, by the monitoring software triggers a recording in a memory accessible by the monitoring software of a history of incidents, especially by way of the data obtained during the measuring step of the instantaneous consumption.

According to another particular feature, the comparison step between data representative of the instantaneous consumption and data representative of the usual consumption by the monitoring software enables said identification of at least one batch likely to participate in the cause of said incident.

According to another particular feature, said identification of at least one batch likely to participate in the cause of said incident is based on at least one correlation between data relative to the detected incident and during analysis and data relative to an earlier incident.

According to another particular feature, said correlation comprises at least one of the following steps:
- comparative analysis between the data representative of the footprint of the batches and the data representative of the history of the incidents;
- comparative analysis between the data representative of the footprint of the batches and the data representative of the usual consumption.

According to another particular feature, the measuring step of the instantaneous consumption is conducted by way of previous deployment of a plurality of probes measuring various parameters whereof the monitoring tool transmits the data representative of the values measured in this way to the monitoring software.

According to another particular feature, the data generated during the measuring step of the instantaneous consumption are used by the monitoring software for calculating the data stored during the recording step of the usual consumption.

According to another particular feature, the follow-up step of the execution of batches over time, by way of data representative of said planning calendar, is obtained following a previous planning step by a user of the monitoring software allowing the latter to record data representative of the calendar.

Another aim of the present invention is to eliminate some drawbacks of the prior art by proposing a system enabling diagnosis of congestion incidents in the IT infrastructure.

This aim is achieved by a system for monitoring batch processing of applications executed in IT infrastructure, according to a planning calendar determined by a scheduler, the system being characterized in that it comprises computer means on which is executed monitoring software configured for detection of at least one event, known as incident, of congestion of computing resources of said infrastructure and for identification of at least one batch likely to participate in the cause of said incident, by way of implementing the method according to the invention.

Another aim of the present invention is to eliminate some drawbacks of the prior art by proposing a program enabling diagnosis of congestion incidents in the IT infrastructure.

This aim is achieved by a computer program product, stored on a medium readable by computer means and containing instructions executable by these computer means for implementing the method according to the invention.

DESCRIPTION OF THE ILLUSTRATIVE FIGURES

Other particular features and advantages of the present invention will become more clearly apparent upon reading the following description given in reference to the appended drawings, in which.

DESCRIPTION OF PREFERRED EMBODIMENTS OF THE INVENTION

Figure 1:
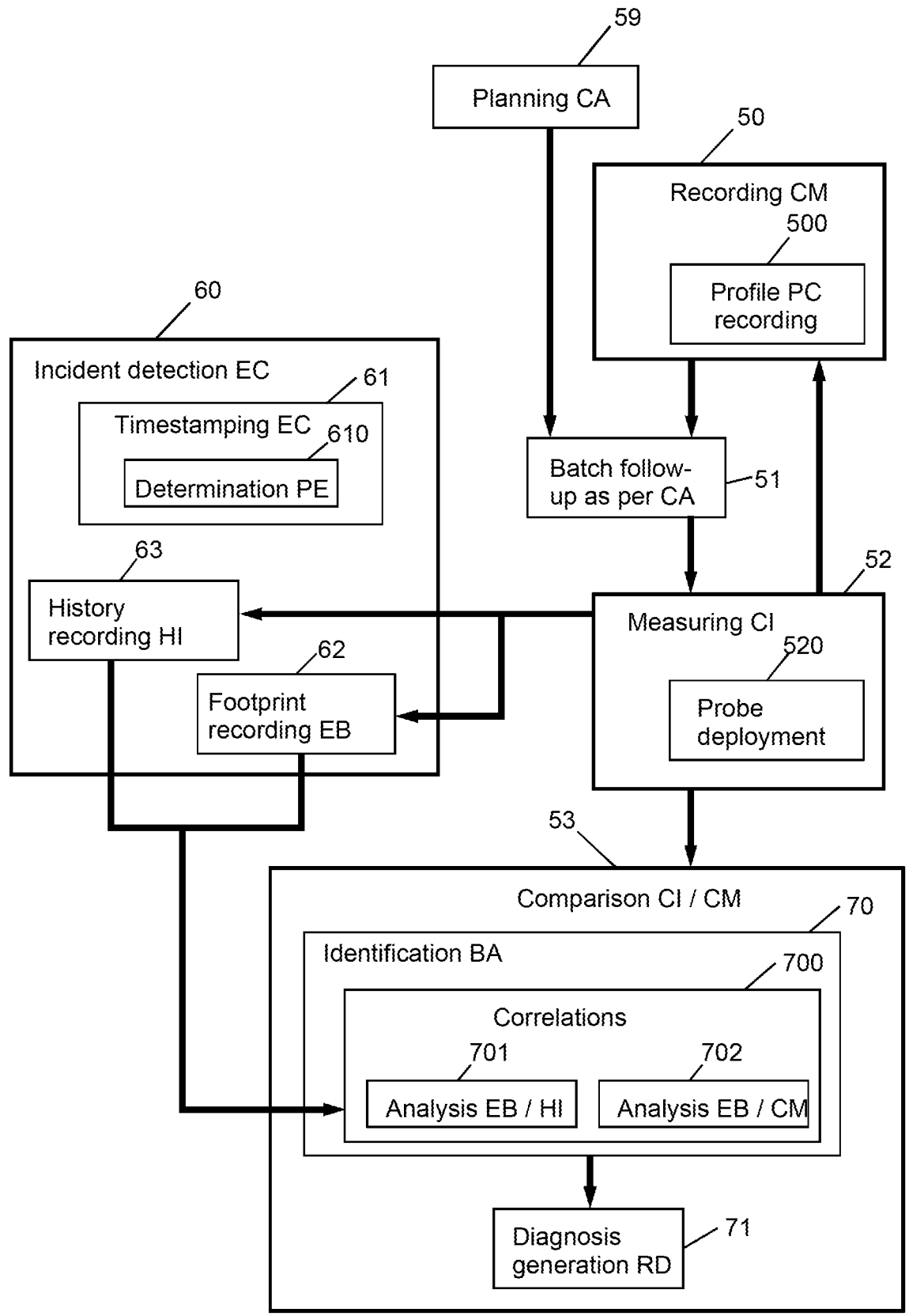
FIG. 1 illustrates the steps of a method according to an embodiment of the invention.

The present invention relates to a method and a system for monitoring batch processing of applications executed in IT infrastructure, and a computer program product for implementing the method.

The terms "scheduler" and "planning calendar (CA)" are used in the present description in their meaning respectively signifying "scheduling program" and "execution time scheduling" or any equivalent to the scope of the skilled person and they must not be interpreted as limiting beyond the functionalities to which they refer.

In general, the present application refers to functional characteristics and uses the terms "a" or "an", but it is evident for the skilled person that this in fact is about "of at least one" and that it is unnecessary to specify the number, unless mentioned explicitly in the text. Also, the present application refers to computer means and IT infrastructures without providing details on the precise structural characteristics or the types of terminals involved, as it is clear the skilled person will be able to appreciate the possible variants from reading the functional considerations supplied in the present application. In this way, the present description and the figures to which it refers must not be interpreted as limiting.

The present application further relates to a method for monitoring batch (BA) processing of applications executed in IT infrastructure (FW), according to a planning calendar (CA) determined by a scheduler. This method is generally implemented by monitoring software (LS) configured on the one hand, for detection (60) of at least one event, known as incident (EC), of congestion of computing resources of said infrastructure (FW) and on the other hand, for identification (70) of at least one batch (BA) likely to participate in the cause of said incident (EC). This detection (60) and this identification (70) are preferably obtained by way of the implementing the following steps:
- recording (50) in a memory accessible by the monitoring software (LS) data representative of the usual consumption (CM) of the computing resources of said infrastructure (FW) by the batches (BA) over time, from the data representative of said planning calendar (CA);
- follow-up (51) of the execution of all the batches (BA) over time by way of the data representative of said planning calendar (CA);
- measuring (52), by a monitoring tool (SU) of the instantaneous consumption (CI) of the computing resources of said infrastructure (FW) over time;
- comparison (53), for each of the batches (BA) executed during a period (PE) close to the detected incident (EC), between the data representative of the instantaneous consumption (CI) and the data representative of the usual consumption (CM), to enable said identification (70).

In some embodiments, the recording step (50) of the data representative of the usual consumption (CM) of the computing resources comprises a recording step (500), for each of the batches (BA), of a consumption profile (PC) of the resources throughout the duration of execution of the batch. In fact, since the consumption of resources is not constant over the period of execution, it is necessary to consider the consumption of the resources throughout the duration of execution of the batch. In some embodiments, data representative of the usual consumption (CM) comprise for example data representative of information such as consumption of processing power, memory used and/or free memory, the quantity of inputs/outputs of the network and/or of the storage memories, processes executing on the machine, etc.

In some embodiments, the detection step (60) of at least one incident (EC) of the computing resources of said infrastructure (FW) triggers timestamping (61) of said incident (EC). In some embodiments, this timestamping (61) of said incident (EC) is followed by determination (610) of the time period (PE) close to this event, by the monitoring software (LS), this period able to be extended to a time interval preceding and/or succeeding the event.

In some embodiments, the detection step (60) of at least one incident (EC), by the monitoring software (LS) triggers a recording (62), in a memory accessible by the monitoring software (LS), of a footprint (EB) for each of the batches (BA) executed during said period (PE) close to the incident (EC), especially by way of the data obtained during the measuring step (52) of the instantaneous consumption (CI). During this recording (62) of the footprint (EB) of batches (BA), the monitoring software (LS) preferably uses the information coming from measuring (52) the instantaneous consumption (CI) by the monitoring tool (SU) to generate a real footprint rather than being based on the calendar (CA) and therefore less accurate estimation of the use of resources. In some embodiments, the data representative of such a footprint (EB) comprise for example data representative of information such as: all resource consumption, timestamping, input/output data, but also potentially a resource consumption profile (PC), for example obtained via the recording step (50) of the usual consumption (CM). Also, the input/output data can have different forms, such as for example files used or generated, databases, data originating from the network (intranet, extranet, internet . . . ), etc.

In some embodiments, the detection step (60) of at least one incident (EC), by the monitoring software (LS), triggers a recording (63), in a memory accessible by the monitoring software (LS), of a history of incidents (HI), especially by way of the data obtained during the measuring step (52) of the instantaneous consumption (CI). In some embodiments, data representative of this history of incidents (HI) comprise for example data representative of information such as timestamping, context of batches executing over the period of the incident, all resource consumption, but also potentially also a diagnosis (RD) coming from the identification (70) obtained during analysis of an earlier incident.

In some embodiments, the comparison step (53) between the data representative of the instantaneous consumption (CI) and the data representative of the usual consumption (CM), by the monitoring software (LS), enables said identification (70) of at least one batch (BA) likely to participate in the cause of said incident (EC). This comparison step (53) can especially correspond to at least one calculation of a variable identifying a level of use of resources by each batch, for example for comparison relative to a threshold or a standard average value. Said identification (70) of at least one batch (BA) likely to participate in the cause of said incident (EC) is preferably based on at least one correlation (700) between data relative to the detected incident (EC) and during analysis and data relative to an earlier incident. In some embodiments, said correlation (700) comprises at least one of the following steps:
- comparative analysis (701) between the data representative of the footprint (EB) of the batches and the data representative of the history of the incidents (HI);
- comparative analysis (702) between the data representative of the footprint (EB) of the batches and the data representative of the usual consumption (CM).

In some embodiments, the identification step (70) obtained during analysis of an incident (EC) triggers generation (71) by the monitoring software (LS) of a diagnosis report (RD) for providing aid to analysis and/or decision for a user of the monitoring software (LS) to determine the measures to be taken to avoid other incidents (CE) during future execution of the batches (BA) and optionally modify the calendar (CA) as a consequence. In fact, the diagnosis report can for example be in the form of a synthetic table of the use of resources, showing for example the levels of use relative to the usual consumption. This type of report or table could showcase those resources which are characteristics of the incident, for example by listing the characteristics of the detected incident. In this way, each batch which can be involved in the incident can be identified by a user who accesses information relative to the resources which was missing during congestion, which modifies the planning calendar of the batches or even reviews the organization of the IT infrastructure.

In some embodiments, the measuring step (52) of the instantaneous consumption (CI) is conducted by way of previous deployment (520) of a plurality of probes measuring various parameters whereof the monitoring tool (SU) transmits the data representative of the values measured in this way to the monitoring software (LS). In order to monitor IT infrastructure (FW), it is generally preferable to deploy several probes, often managed by several specific tools, which each monitor at least one parameter of various types of (generally physical) parameters, such as for example processing power consumption, memory used and/or free memory, quantity of inputs/outputs of the network and/or of the storage memories, processes executing on the machine, etc. The monitoring software (LS) could be configured either to communicate directly with this monitoring tool (SU) or to later access the data measured by this monitoring tool (SU).

In some embodiments, the data generated during the measuring step (52) of the instantaneous consumption (CI) are used by the monitoring software (LS) for calculating the data stored during the recording step (50) of the usual consumption (CM).

In some embodiments, the follow-up step (51) of the execution of the batches (BA) over time, by way of the data representative of said planning calendar (CA), is obtained following a previous planning step (59), by a user of the monitoring software (LS), allowing the latter to record data representative of the calendar (CA).

Figure 2:
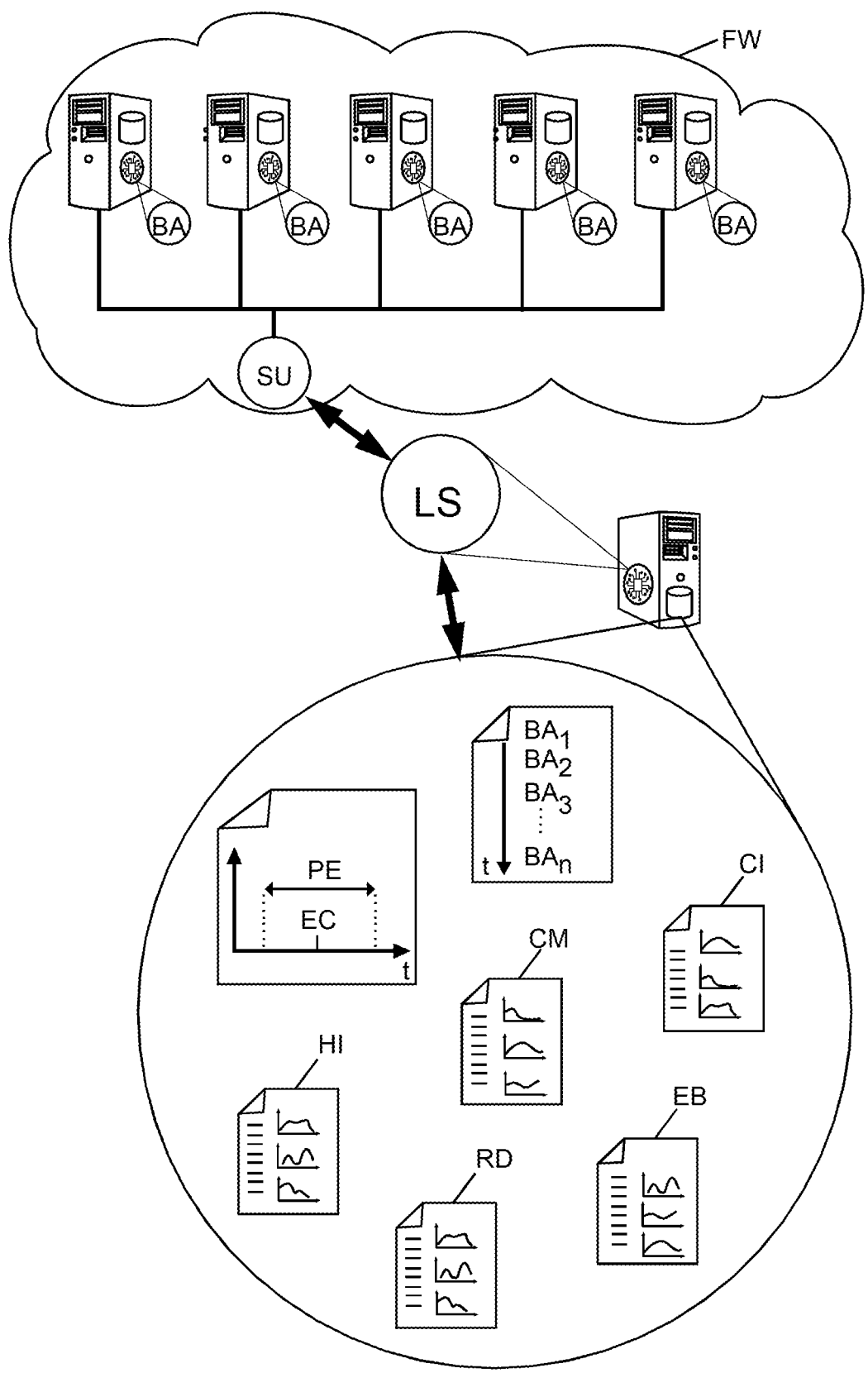
FIG. 2 illustrates a system according to an embodiment of the invention.

The present application thus also relates to a system for monitoring batch processing. This system comprises computer means on which is executed monitoring software (LS), configured for implementing the method according to various embodiments of the invention. As shown in FIG. 2, such computer means can be separate from those present in the IT infrastructure (FW) monitored by way of communication between them, and especially between the monitoring software and a monitoring tool (SU) present in the IT infrastructure (FW), but it is of course possible to execute them within this IT infrastructure (FW). These computer means and the computing resources of said infrastructure (FW) naturally comprise at least one processor and at least one memory or database, for example implemented in servers communicating between each other. On the other hand, the present application also relates to a computer program product, stored on a medium readable by computer means and containing instructions executable by these computer means for implementing the method according to the invention. In this way, the functionalities proposed by the method can be deployed on various computer means for monitoring various IT infrastructure (FW).

The present application describes various technical characteristics and advantages in reference to the figures and/or various embodiments. The skilled person will understand that the technical characteristics of a given embodiment can actually be combined with characteristics of another embodiment unless explicitly stated otherwise or is evident that these characteristics are incompatible, or the combination provides no solution to at least one of the technical problems mentioned in the present application. Also, the technical characteristics described in a given embodiment can be isolated from the other characteristics of this mode unless explicitly stated otherwise.

It must be evident for skilled persons that the present invention enables embodiments in many other specific forms without departing from the field of application of the invention as claimed. Consequently, the present embodiments must be considered by way of illustration, but can be modified in the field defined by the scope of the attached claims and the invention must not be limited to the details given hereinabove.

The invention claimed is:

1. A method for monitoring batch processing of applications executed in IT infrastructure, according to a planning calendar determined by a scheduler, the method being implemented by monitoring software configured for detection of at least one incident, of congestion of the computing resources of said infrastructure and for identification of at least one batch likely to participate in the cause of said incident, by way of implementing the following steps:
    recording, in a memory accessible by the monitoring software, of data representative of the usual consumption of the computing resources of said infrastructure by the batches over time, from the data representative of said planning calendar;
    follow-up of the execution of all the batches over time, by way of the data representative of said planning calendar;
    measuring, by a monitoring tool, of the instantaneous consumption of the computing resources of said infrastructure over time; and
    comparison, for each of the batches executed during a period close to the detected incident, between the data representative of the instantaneous consumption and the data representative of the usual consumption, to enable said identification.

2. The method according to claim 1, wherein the detection step of at least one incident of the computing resources of said infrastructure triggers timestamping of said incident.

3. The method according to claim 2, wherein the timestamping step of said incident is followed by determination of the time period close to said incident, by the monitoring software, this period able to be extended to a time interval preceding and/or succeeding said event.

4. The method according to claim 1, wherein the recording step of the data representative of the usual consumption of the computing resources comprises a recording step, for each of the batches, of a consumption profile of the resources throughout the duration of execution of the batch.

5. The method according to claim 1, wherein the identification step obtained during analysis of an incident triggers generation, by the monitoring software, of a diagnosis report for providing aid to analysis and/or decision for a user of the monitoring software to determine the measures to be taken to avoid other incidents during future execution of the batches and optionally modify the calendar as a consequence.

6. The method according to claim 1, wherein the detection step of at least one incident, by the monitoring software, triggers recording, in a memory accessible by the monitoring software, of a footprint for each of the batches executed during said period close to the incident, especially by way of the data obtained during the measuring step of the instantaneous consumption.

7. The method according to claim 1, wherein the detection step of at least one incident, by the monitoring software, triggers a recording, in a memory accessible by the monitoring software, of a history of incidents, especially by way of the data obtained during the measuring step of the instantaneous consumption.

8. The method according to claim 1, wherein the comparison step between the data representative of the instantaneous consumption and the data representative of the usual consumption, by the monitoring software, enables said identification of at least one batch likely to participate in the cause of said incident.

9. The method according to claim 6, wherein said identification of at least one batch likely to participate in the cause of said incident is based on at least one correlation between data relative to the detected incident during analysis and data relative to an earlier incident.

10. The method according to claim 9, wherein said correlation comprises at least one of the following steps:
    comparative analysis between the data representative of the footprint of the batches and the data representative of the history of the incidents; and
    comparative analysis between the data representative of the footprint of the batches and the data representative of the usual consumption.

11. The method according to claim 1, wherein the measuring step of the instantaneous consumption is conducted by way of previous deployment of a plurality of probes measuring various parameters whereof the monitoring tool transmits the data representative of the values measured in this way to the monitoring software.

12. The method according to claim 1, wherein the data generated during the measuring step of the instantaneous consumption are used by the monitoring software for calculating the data stored during the recording step of the usual consumption.

13. The method according to claim 1, wherein the follow-up step of the execution of the batches over time, by way of the data representative of said planning calendar, is obtained following a previous planning step, by a user of the monitoring software, allowing the latter to record data representative of the calendar.

14. A system for monitoring batch processing of applications executed in IT infrastructure, according to a planning calendar determined by a scheduler, the system being characterized in that it comprises computer means on which is executed monitoring software configured for detection at least one incident, of congestion of the computing resources of said infrastructure and for identification of at least one batch likely to participate in the cause of said incident, by way of implementing the method according to claim 1.

15. A computer program product, stored on a medium readable by computer means and containing instructions executable by these computer means for implementing the method according to claim 1.

* * * * *